US009088792B2

(12) United States Patent
Chiu et al.

(10) Patent No.: US 9,088,792 B2
(45) Date of Patent: Jul. 21, 2015

(54) STEREOSCOPIC FLAT PANEL DISPLAY WITH SYNCHRONIZED BACKLIGHT, POLARIZATION CONTROL PANEL, AND LIQUID CRYSTAL DISPLAY

(75) Inventors: Joseph Chiu, Boulder, CO (US); Lenny Lipton, Los Angeles, CA (US); Matt Cowan, Bloomington Providence Ontario (CA); Rod Archer, Boulder, CO (US); Klaus Zietlow, Kensington, CA (US); Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 12/853,283

(22) Filed: Aug. 9, 2010

(65) Prior Publication Data

US 2011/0210964 A1 Sep. 1, 2011

Related U.S. Application Data

(63) Continuation-in-part of application No. 12/156,683, filed on Jun. 4, 2008, now abandoned.

(60) Provisional application No. 60/933,776, filed on Jun. 8, 2007, provisional application No. 61/232,346, filed on Aug. 7, 2009.

(51) Int. Cl.
*H04N 13/04* (2006.01)
*G09G 3/00* (2006.01)
(Continued)

(52) U.S. Cl.
CPC ........... *H04N 13/0497* (2013.01); *G09G 3/001* (2013.01); *G09G 3/003* (2013.01);
(Continued)

(58) Field of Classification Search
USPC .......................................................... 348/51
See application file for complete search history.

(56) References Cited

U.S. PATENT DOCUMENTS 4,792,850 A 12/1988 Lipton
5,564,810 A 10/1996 Larson
(Continued)

FOREIGN PATENT DOCUMENTS

EP 860730 A2 8/1998
EP 1742492 A2 1/2007
(Continued)

OTHER PUBLICATIONS

"light (physics)". Encyclopdia Britannica. Encyclopdia Britannica Online. Encyclopdia Britannica Inc., 2013. Web. Dec. 10, 2013 <http://w w w .britannica.com/EBchecked/topic/340440/light/258420/Unpolarized-light>.*

(Continued)

*Primary Examiner* — Jeremaiah C Hallenbeck-Huber
(74) *Attorney, Agent, or Firm* — Darlene K. Kondo; Neil G. J. Mothew

(57) ABSTRACT

An enhanced liquid crystal display design is provided having relatively fast response time particularly useful in high speed or highly intense applications, such as stereoscopic or autostereoscopic image display. The liquid crystal display device is configured to display stereoscopic images, and comprises an LCD panel and control electronics configured to drive the LCD panel to a desired 10 stereoscopic display state. The control electronics are configured to employ transient phase switching and overdrive the LCD panel to a desired state to enable relatively rapid display of stereoscopic images.

25 Claims, 12 Drawing Sheets

(51) Int. Cl.
  *G09G 3/36* (2006.01)
  *G09G 5/36* (2006.01)
  *G09G 5/399* (2006.01)

(52) U.S. Cl.
  CPC ............ *G09G 3/36* (2013.01); *H04N 13/0434* (2013.01); *H04N 13/0438* (2013.01); *G09G 5/363* (2013.01); *G09G 5/399* (2013.01); *G09G 2320/0247* (2013.01); *G09G 2320/0252* (2013.01); *G09G 2320/0261* (2013.01)

(56) References Cited

U.S. PATENT DOCUMENTS

| | | | |
|---|---|---|---|
| 5,991,074 | A | 11/1999 | Nose et al. |
| 6,774,977 | B1* | 8/2004 | Walton et al. .................. 349/177 |
| 7,190,518 | B1* | 3/2007 | Kleinberger et al. .......... 359/465 |
| 7,705,935 | B2* | 4/2010 | Gaudreau ......................... 349/96 |
| 2002/0075202 | A1* | 6/2002 | Fergason .......................... 345/32 |
| 2005/0140634 | A1 | 6/2005 | Takatori |
| 2006/0125774 | A1* | 6/2006 | Nishigaki ....................... 345/102 |
| 2007/0008406 | A1* | 1/2007 | Shestak et al. ................... 348/58 |
| 2007/0035672 | A1 | 2/2007 | Shestak et al. |
| 2007/0195163 | A1* | 8/2007 | Chestak et al. .................. 348/58 |
| 2007/0229951 | A1* | 10/2007 | Jung et al. ...................... 359/465 |
| 2008/0316303 | A1 | 12/2008 | Chiu |
| 2010/0302353 | A1 | 12/2010 | Lee |

FOREIGN PATENT DOCUMENTS

| | | |
|---|---|---|
| GB | 2354833 A | 9/1999 |
| JP | 10-142557 | 5/1998 |
| JP | 2001154640 A | 6/2001 |
| JP | 2002101427 A | 4/2002 |
| JP | 2003-202519 | 7/2003 |
| JP | 2005-077437 A | 3/2005 |
| JP | 2007-279717 A | 10/2007 |
| KR | 102007006553 A | 1/2007 |
| KR | 100677637 B1 | 2/2007 |
| KR | 1020080024901 A | 3/2008 |
| KR | 1020090018528 A1 | 2/2009 |
| KR | 1020100023613 A1 | 3/2010 |
| WO | 2011-033684 A1 | 3/2011 |

OTHER PUBLICATIONS

International Search Report and written opinion of international searching authority in co-pending PCT/US10/44934 dated Feb. 25, 2011.

Notification of Transmittal of International Preliminary Report on Patentability and International Preliminary Report on Patentability for PCT/US10/44934 dated Apr. 9, 2012 and The International Preliminary Report on Patentability patent application No. PCT/US10/44934 dated Mar. 7, 2012.

Communication from European Patent Office regarding European search report in European Patent Application No. 11176585. mailed May 7, 2012.

Notice of Reasons for Rejection from Japanese patent application 2011-113855 dated Oct. 2, 2012.

Final notice of reasons for rejection from Japanese patent application 2011-113855 dated Jun. 11, 2013.

Extended European Search Report for co-pending EP application No. 12194887.1, mailed Aug. 4, 2014.

* cited by examiner

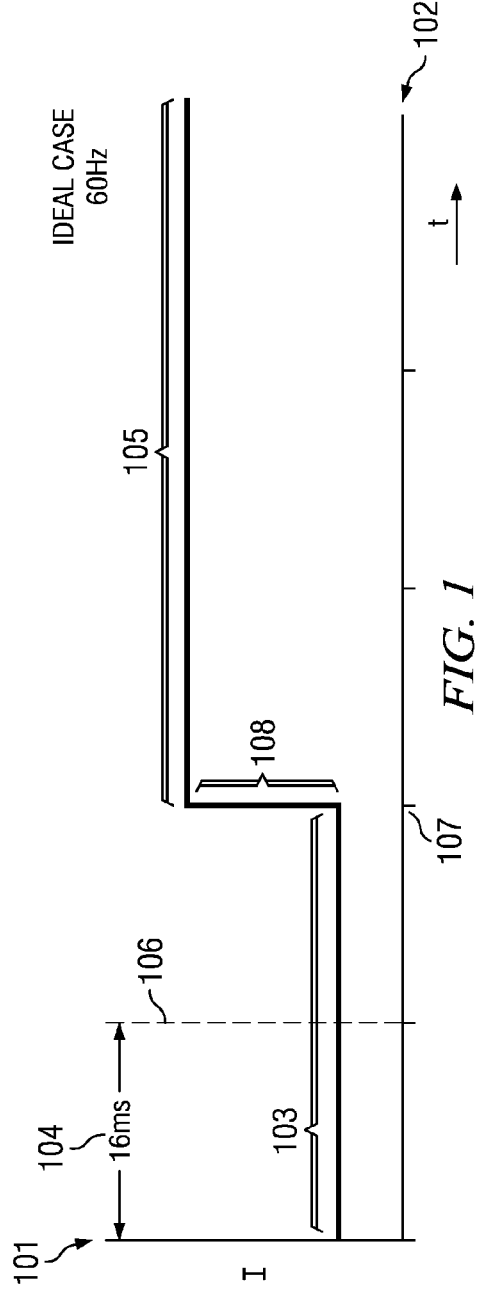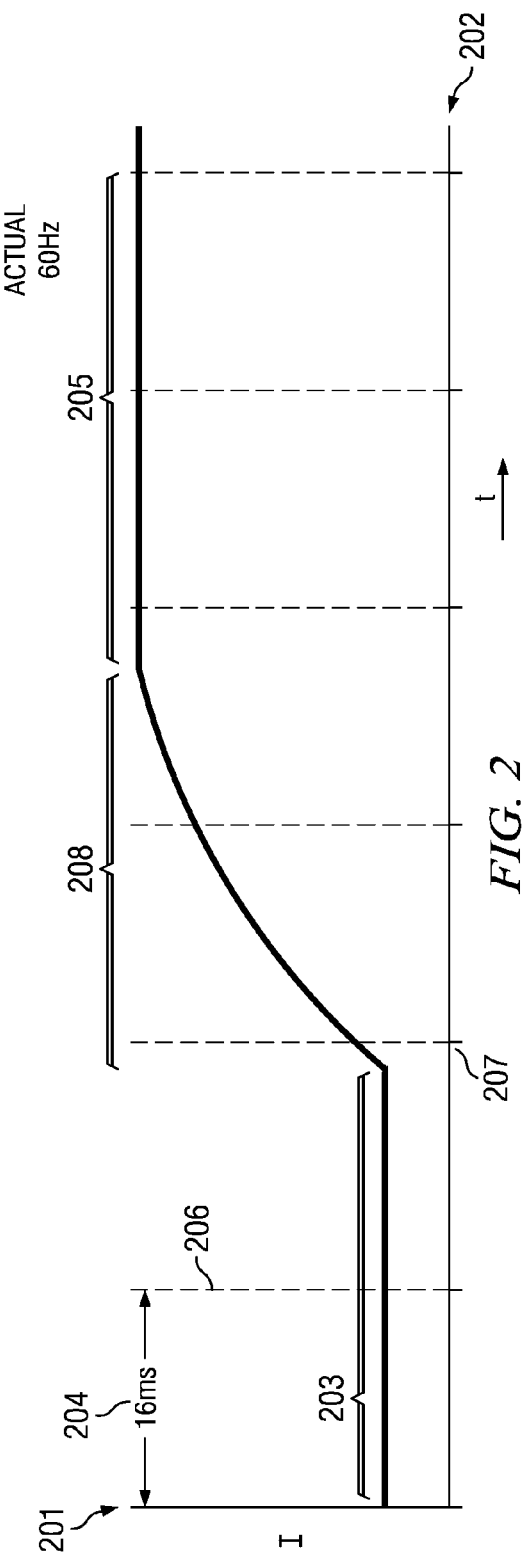

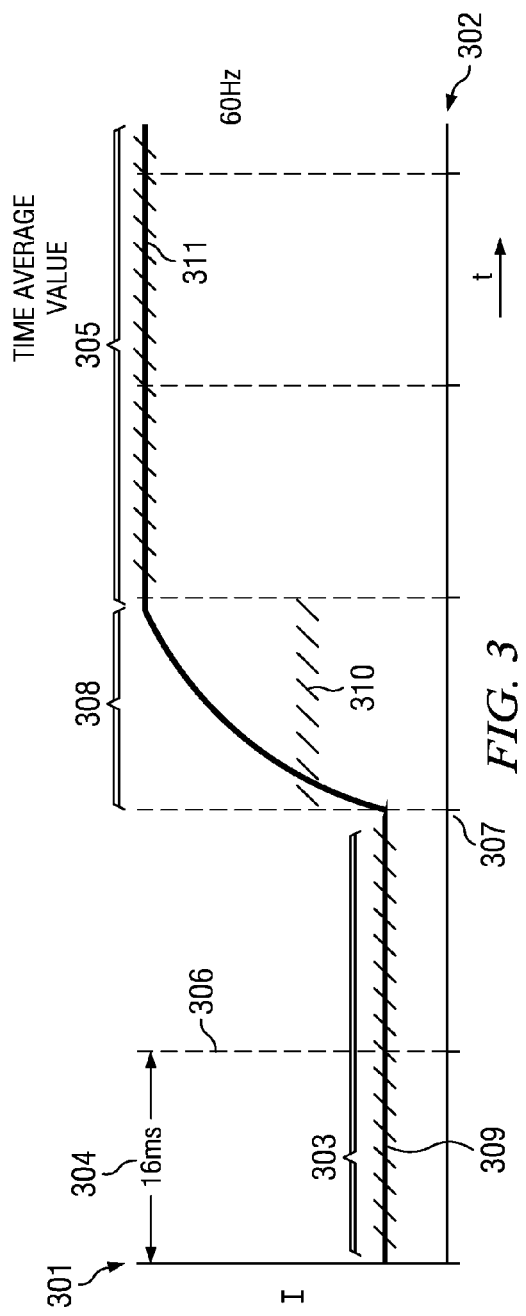
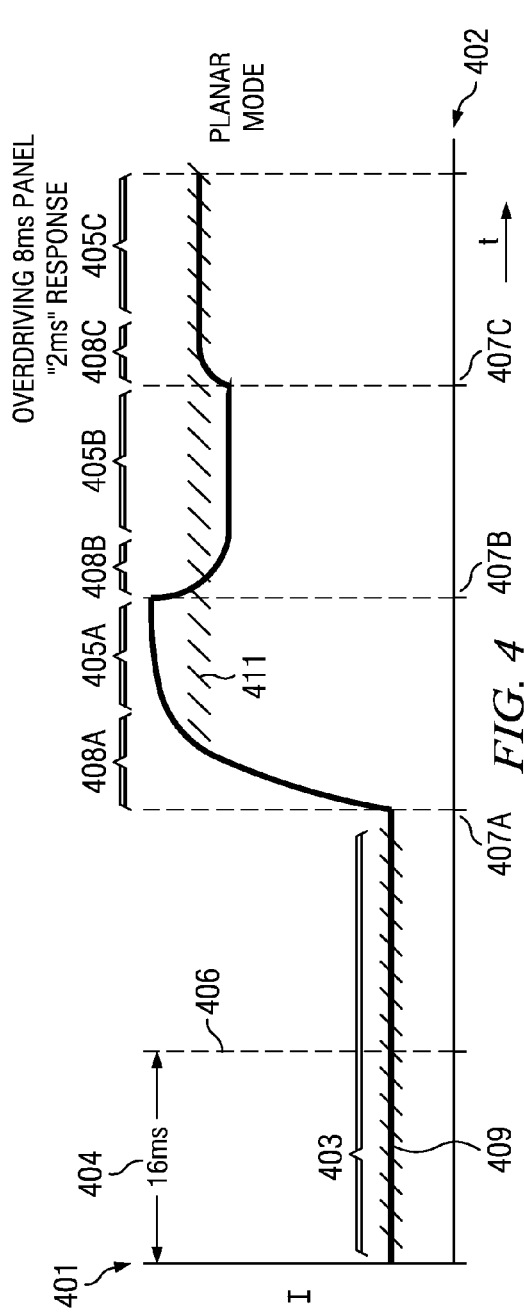

STEREOSCOPIC FLAT PANEL DISPLAY WITH SYNCHRONIZED BACKLIGHT, POLARIZATION CONTROL PANEL, AND LIQUID CRYSTAL DISPLAY

CROSS-REFERENCE TO RELATED APPLICATIONS

This application is a continuation-in-part and claims the benefit of U.S. patent application Ser. No. 12/156,683, filed Jun. 4, 2008 entitled "Display Device" which claims benefit of U.S. Provisional Patent Application Ser. No. 60/933,776, filed Jun. 8, 2007 entitled "Display Device," to Joseph Chiu, et al.; this application also claims the benefit of U.S. Prov. Patent Application Ser. No. 61/232,346, filed Aug. 7, 2009, entitled "Liquid crystal three dimensional display," the entirety of which are incorporated herein by reference. It should be noted that this application is being filed on Monday Aug. 9, 2010, which is the first business day following the one year anniversary of Aug. 7, 2009, pursuant to MPEP §710.05.

BACKGROUND

1. Field of the Invention

The present invention relates generally to the art of displays, and more specifically liquid crystal displays.

2. Description of the Related Art

Liquid crystal displays are currently readily available. The ability for liquid crystal displays to provide high quality images for complex applications, such as stereoscopic or autostereoscopic applications, is limited by the ability of the display to provide data to pixels in a very short amount of time. Currently available displays in general do not have the response time required to provide a high quality image in stereoscopic applications, and the result is an image that looks less than ideal, particularly when transitioning from dark colors (e.g. black) to light colors (e.g. white) and vice versa. Rapid response time in a liquid crystal display is highly desirable.

It would therefore be desirable to provide a liquid crystal display having improved functionality over designs previously available, including but not limited to a liquid crystal display that provides faster response time for the display of high quality images such as stereoscopic or autostereoscopic images.

BRIEF SUMMARY

According to one aspect of the present design, there is provided a liquid crystal display device is configured to display stereoscopic images, and comprises an LCD panel and control electronics configured to drive the LCD panel to a desired stereoscopic display state. The control electronics are configured to employ transient phase switching and overdrive the LCD panel to a desired state to enable relatively rapid display of stereoscopic images.

According to another aspect of the present disclosure, a flat panel display operable to display stereoscopic imagery is provided. The display includes a spatially controllable backlight with a plurality of illuminating portions operable to selectively provide light. The display also includes a liquid crystal (LC) modulation panel having modulation regions. The display also includes a polarization control panel (PCP) having a plurality of polarization control segments associated with the modulation regions. The polarization control segments may selectively transform the state of polarization (SOP) of modulated light incident from the modulation regions. A selected modulation region is addressed with left eye image data and polarization control instructions are provided to a polarization control segment associated with the selected modulation region. The polarization control instructions control the polarization control segment to operate in a left eye polarization display mode when a portion of the data lines in the selected modulation region display a predetermined portion of the left eye image frame. Light is provided to the selected modulation region from selected illuminating portions when the selected modulation region is settled and is presenting image data corresponding to the left eye polarization control instructions.

According to yet another aspect of the present design, a method of displaying stereoscopic imagery on a stereoscopic flat panel display is provided. The display has a spatially controllable backlight with a plurality of illuminating portions, a liquid crystal (LC) modulation panel having modulation regions, and a polarization control panel (PCP) having a plurality of polarization control segments associated with the modulation regions. The backlight is operable to selectively provide light to the LC modulation panel. The polarization control segments are operable to selectively transform the state of polarization (SOP) of modulated light incident from the modulation regions. The method includes addressing data lines in a selected modulation region on the LC modulation panel with left eye image data. The method also includes providing polarization control instructions to a polarization control segment associated with the selected modulation region. The polarization control instructions control the polarization control segment to operate in a left eye polarization display mode when a portion of the data lines in the selected modulation region display a predetermined portion of the left eye image frame. The method also includes providing light to the selected modulation region from one or more selected illuminating portions. The selected modulation region includes a settled modulation region presenting image data corresponding to the left eye polarization control instructions.

These and other advantages of the present disclosure will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which:

FIG. 1 is an ideal representation of a perfect display;

FIG. 2 illustrates that change in LCD display pixel intensity does not occur instantaneously;

FIG. 3 shows the change in the pixel intensity in a faster LCD than that shown in FIG. 2;

FIG. 4 represents the concept of overdriving in a display wherein there is no in-between perceived pixel intensity between the initial state and the final state of the display;

DETAILED DESCRIPTION

Figure 5:
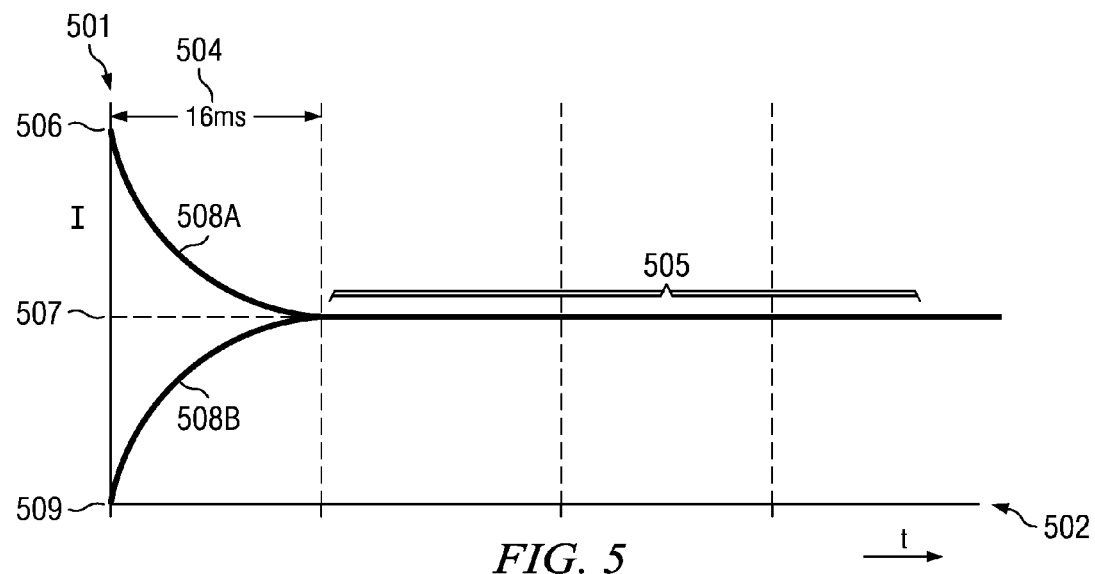
FIG. 5 illustrates that whether starting from high or low value, in the duration of one frame or one field, the liquid crystal will arrive at a target value.

FIG. 1 represents the ideal representation of a perfect display. What we show in this drawing is the axis 101 which represents the pixel intensity, and axis 102 which represents time. In this drawing you see the dotted lines 106 and 107. Those dotted lines describe the frame update intervals. That is, every 16-millisecond interval, as noted by 104, the display is updated to show a new pixel value. In this figure, FIG. 1, we show that during the interval marked by 103 the pixel is of one value, and when the display is updated at time location 107 the pixel will assume a new value shown by the interval 105. In the ideal world, the pixel will change instantaneously as shown by the vertical slope at 108. This is an ideal case, where in an ideal "perfect-world" display a pixel will hold one value and as soon as the pixel is updated it will instantaneously go to its new value and maintain that value.

FIG. 2 shows that in a real-world implementation of liquid crystal devices, the change in the pixel intensity does not occur instantaneously. Similar to FIG. 1, two axes are provided with the intensity of the pixel represented on 201 and the time line on 202. The interval for each display field is 16 milliseconds as indicated by 204. The dotted lines 206 and 207, and all the other dotted lines, indicate each moment that the display is refreshed. This example shows one set of pixel values over two frames marked by interval 203. At time 207 we update the display to try to bring the pixel to a new value, which is the steady state marked by interval 205. Unlike FIG. 1, where in notation 108 the pixel response is instantaneous, in FIG. 2 at point 208, the liquid crystal responds much more slowly to reach the final pixel value; and in this case, with FIG. 2, a fairly slow panel is shown, and it takes more than one frame period for the pixel to reach the final steady-state value.

FIG. 3 is similar to FIG. 2, but represents a faster liquid crystal device. In FIG. 3, again axes 301 and 302 are shown, with axis 301 indicating pixel intensity and axis 302 indicating time. The field interval is 16 milliseconds as indicated by point 304, and the frame updates are marked again by the vertical dotted lines (for example, at points 306 and 307). FIG. 3 shows that the pixel is at a steady value over the first two frames noted by the interval 303, and then updated to what will ultimately become the steady-state value noted by interval 305. The transition period starting at time location 307 and represented by interval 308 shows that the liquid crystal intensity changing in response to the update that occurred at time 307 completes within one frame period. What is shown in this drawing is a representation of a liquid crystal display that can change the pixel value in under one frame rate and settle to a steady-state value.

However, FIG. 3 also shows a series of hatched lines 309, 310 and 311, and these hatched lines represent the average value of the liquid crystal during that field duration. During the steady-state interval 303, the intensity of the liquid crystal is flat, so the average perceived intensity for looking at the pixel during that time at the same location (namely the hatched lines 309, and the display or the steady-state interval 305) show as if it has a similar level pixel intensity, marked by hatched lines 311. But during the frame, starting at time 307, when the liquid crystal is going through a transition as indicated by the interval 308, the average value of the pixel intensity is somewhere between the starting and ending value, represented by the hatched lines 310.

FIG. 3 shows an example of what is normally seen as eight millisecond panels. In certain applications that transition value, the perceived pixel intensity 310, is between the initial intensity 309 and the final intensity 311.

Some viewers find "in-between" values visually objectionable. FIG. 4 represents a display that appears to operate much more quickly, such that there is no in-between perceived pixel intensity between the initial state and the final state of the display. In FIG. 4, axes 401 and 402 are shown, with axis 401 representing intensity and axis 402 representing time. FIG. 4 uses a 16-millisecond frame interval as marked by reference 404, and a frame update is marked by the vertical dotted line at points 406. The initial pixel intensity over the interval 403 is illustrated, and the corresponding perceived pixel intensity is marked by the hatched lines 409. The vertical lines 407A, 407B and 407C represent the times when the field is being updated, and the hatched lines 411 represent the final value of the display.

If first displaying a pixel that has the intensity represented by one value is desired, shown as reference 409, and then the display changes seemingly instantaneously to the new display marked by the hatched lines 411, the liquid crystal response over the field between time location 407A and 407B goes from the low to high value in such a way that the average intensity for that field substantially matches the intended perceived pixel intensity shown by reference 411.

So in that first transition, between 407A and 407B, the liquid crystal is going through the changing duration marked by the interval 408A. The liquid crystal then reaches the steady state for the last part of that first field as marked by point 405A. At this point, however, the pixel intensity created by the liquid crystal is above the desired perceived intensity as marked by 411, so for the next field between time 407B and 407C, in order to again give the appearance of a pixel intensity matching the hatched lines 411, the pixel is now be driven to a new value such that the average of the pixel intensity during that frame matches that shown at point 411. The liquid crystal is updated, and the liquid crystal curve is in transition over interval 408B and reaches steady state 405B. The average during this frame will again match the perceived intensity target at hatched lines 411.

[At this point, at the end of this frame, the instantaneous intensity of the liquid crystal is slightly below the desired perceived intensity, so the process repeats using another value to drive the liquid crystal. The liquid crystal goes through a transition again as indicated by the interval 408C, and then reaches a steady state as indicated by point 405C. FIG. 4 thus shows an overdriving technique where, by deliberately steering the liquid crystal to a value either over or above the actual desired target intensity value, the illusion of a much more quickly responding display is formed. The quick response results occurs because the average intensity value, as indicated by the hatched lines 411, represents the target value and does not appear to create an in-between value as shown in FIG. 3 by hatched lines 310.

FIG. 5 expands on the operation of overdriving in the case where the field rate is 16 milliseconds. Axes 501 and 502 are shown, axis 501 representing the intensity of the pixel by the liquid crystal and axis 502 is the time scale. Interval 504 is a 16 millisecond frame interval. FIG. 5 shows that the display may start from a high intensity value or a low intensity value. If the pixel in the past was at a high intensity value, the liquid crystal is at position 506. Starting from a low intensity value begins at position 509.

If, in the steady state interval marked by 505, a mid-level value at the level marked by 507 is desired, the system updates the display such that if the system is starting from a high value 506 and attempting to achieve the midlevel value 507, the device commands the display to update such that the liquid crystal closely follows curve 508A. The liquid crystal over the interval of that frame reaches the steady-state value so that by the end of that frame the liquid crystal reaches the steady state indicated by interval 505.

In the case where the liquid crystal is driven from below, starting from value 509 and seeking to reach the target value of 507, the system updates the display with a value appropriate to reach the steady-state value marked as value 507. The liquid crystal response closely follows the curve 508B and reaches steady state 505.

In either case, whether starting from a high or low value, in the duration of one frame or one field 504, the liquid crystal arrives at the target value 507.

Figure 6:
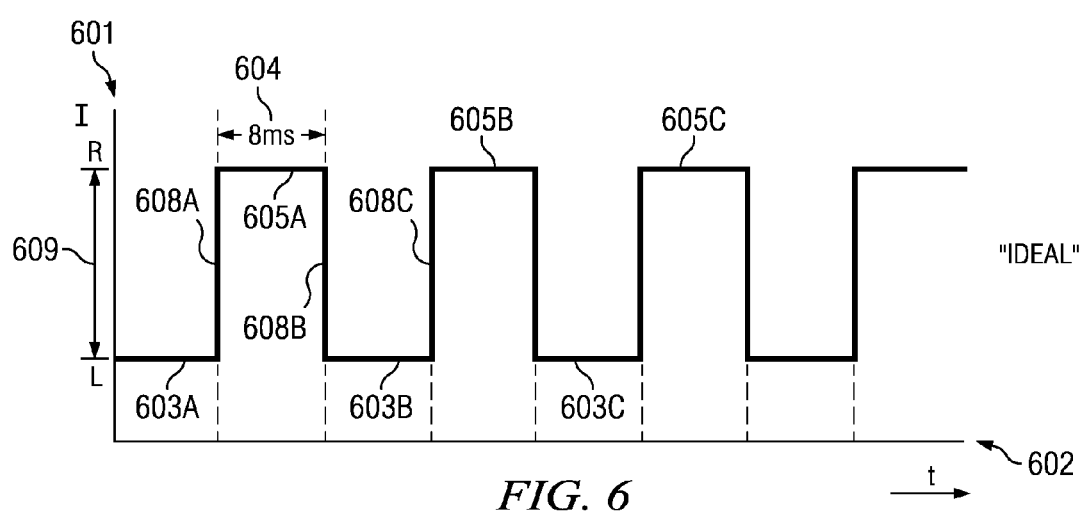
FIG. 6 shows an idealized representation of the display operating in a stereoscopic mode.

All the design aspects discussed so far have described the pixel response of a liquid crystal display used in planar mode. The present design notably addresses a stereoscopic display, and FIG. 6 shows an idealized representation of the display operating in a stereoscopic mode. Stereoscopic display in this context requires additional considerations beyond planar applications. Axis 601 represents intensity and axis 602 represents time. In FIG. 6, every other field or frame represents switching between left and right eyes, and the frame interval in FIG. 6 is 8 milliseconds as noted at point 604. The 8 millisecond frame interval is provided to reduce the appearance of flicker, and flicker reduction can occur using a high enough refresh rate, or a short enough field time.

In this representation the left and right eye pixel values differ, so there is a high pixel value and a low pixel value. For example, the lower value may be the left eye, and the higher value the right eye. The pixel value is represented at point 609 where, again, the higher value is the right eye and lower value is the left eye. In an ideal situation, a representation of the pixel intensity desired for the left eye is as shown at points 603A, 603B and 603C, whereas the representation of the pixel at the right eye is represented by points 605A, 605B and 605C. In this idealized situation, the pixels change instantaneously, as denoted by points 608A, 608B and 608C.

Figure 7:
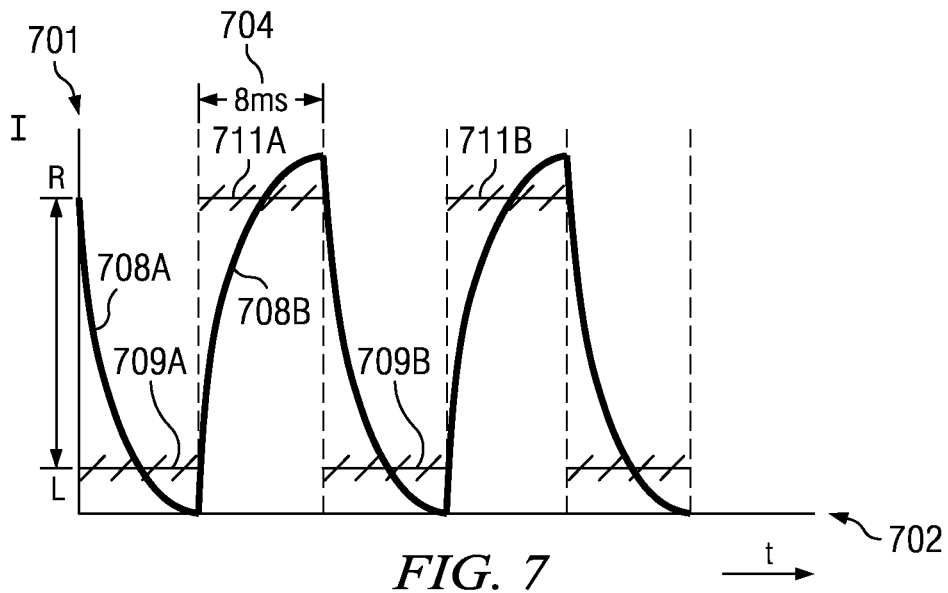
FIG. 7 illustrates the shift between left and right eye views showing to the viewer a perceived intensity that shifts from the left eye to the right eye view.

As discussed, the liquid crystal response time is not instantaneous. In fact, there is some amount of transition time for the liquid crystal. FIG. 7 shows that if the shift between the left and right eye views is to be represented, the LC display presents the viewer a perceived intensity that shifts from the left eye to the right eye view, and that perceived intensity is marked by the hatched lines 709A, 711A, 709B and 711B. Axis 701 shows the intensity and axis 702 shows the time. In order to achieve the perceived value over each frame interval (the frame interval here is 8 milliseconds as noted by 704), the liquid crystal goes through the transition period as marked by 708A and 708B such that the average value for each frame yields the hatched lines 709A and 711A.

Figure 8:
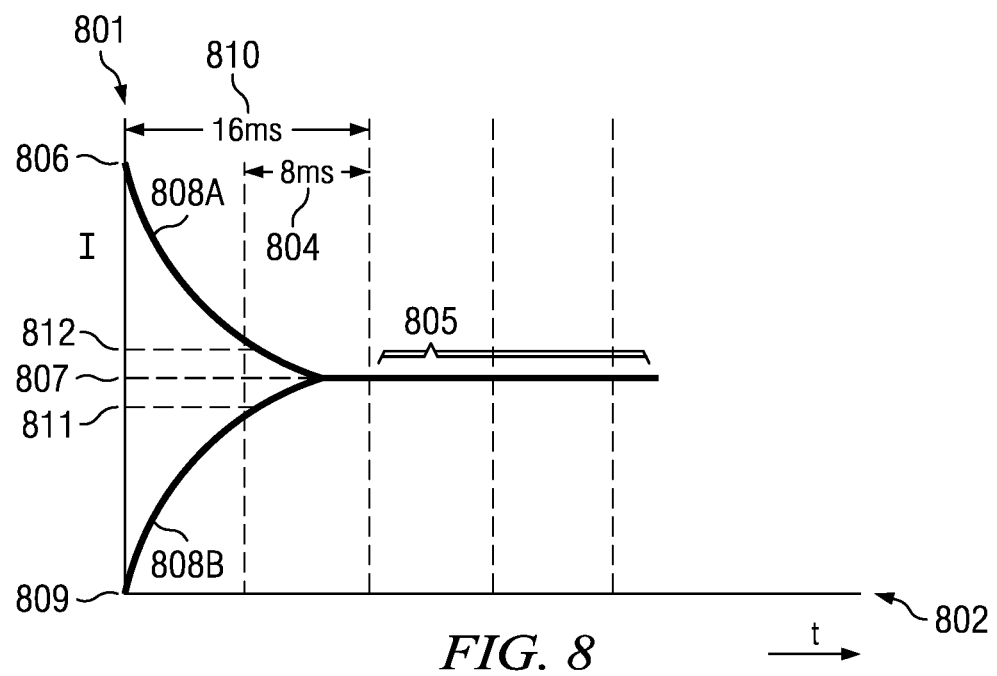
FIG. 8 shows curves of the liquid crystal response.

FIG. 8 shows the curves of the liquid crystal response. Axis 801 is intensity and axis 802 is time. The field is 8 milliseconds long as shown by interval 804. FIG. 8 illustrates starting from a high value 806 or from a low value 809 to a target value of 807. In FIG. 3, the period of the liquid crystal transitioning from low to high is marked at point 308. A similar transition is marked by point 808B in FIG. 8. FIG. 8 illustrates the transition from a low value to the target value, or from value 809, which is the low starting point, to the target point 807. Starting from a high value 806 to the target value 807 results in the liquid crystal substantially following curve 808A.

In the case in which the field interval is 16 milliseconds, as in FIG. 3, no matter whether the LC starts from a high or a low value, the liquid crystal marked by interval 805 reaches the steady state value 807 within one frame, or 16 milliseconds.

In FIG. 8, if the field or the frame rate is such that the field duration is only 8 milliseconds, starting from point 809 (the low value) and attempting to achieve the target value 807, at the end of that frame the liquid crystal will not reach the target value or the steady state, and in fact will only reach an intermediate value 811. If the liquid crystal had started from a high value of 806 and tried to command the display to the target value 807, at the end of that first frame it would only reach an intermediate value 812.

Figure 9A:
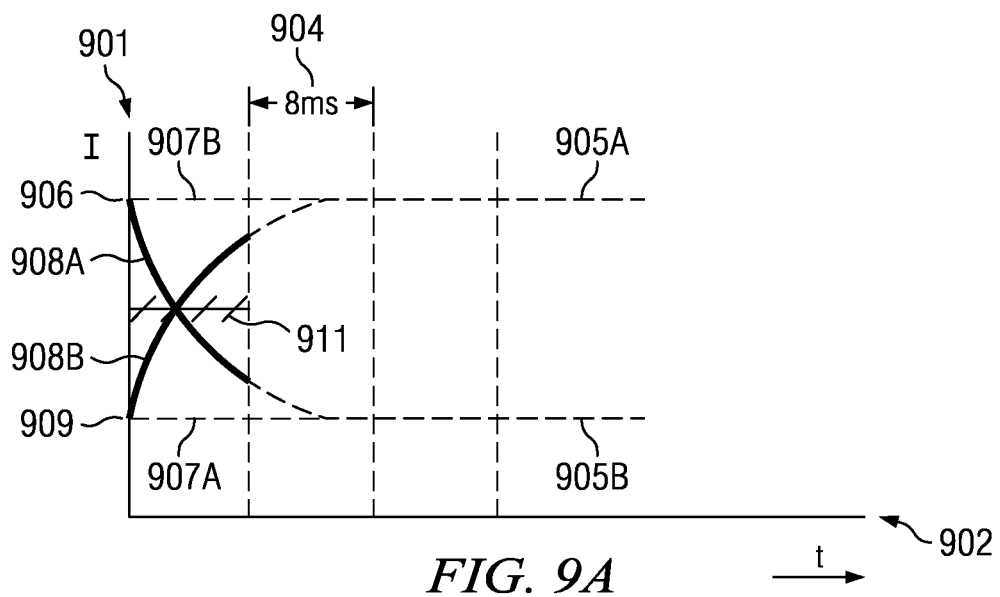
FIG. 9A shows relative operation of a display and perceived intensity.

FIG. 9A has axis 901 representing intensity and axis 902 representing time. Point 904 represents the field rate, or the frame duration here, which is 8 milliseconds. The hatched line 911 represents the desired perceived intensity for one frame.

Had the frame started from a low value 909, the system would need to drive the liquid crystal to a target value higher than the desired perceived intensity, shown as higher value 907B. Driving the liquid crystal from 909 to the target value 907B, the liquid crystal will substantially follow the curve 908B. If the system does not have an 8-millisecond interval but instead had allowed the liquid crystal to continue, the liquid crystal would eventually follow the dotted lines 905A and reach the steady state.

Had the frame started from a high value 906, and the average intensity 911 is desired, the system would have to drive the liquid crystal with a target value 907A, causing the liquid crystal to follow the curve 908A during the first frame interval. Had operation been allowed to continue, the liquid crystal would follow the dotted line reaching a steady state 905B.

FIG. 9A shows that in order to show a perceived pixel intensity as shown by hatched line 911, depending on whether the liquid crystal's actual state is higher or lower, the system needs a different target value to be sent to the display. The different curves being followed, either 908B or 908A, over the duration of the first frame average to represent the desired perceived intensity 911.

Figure 9B:
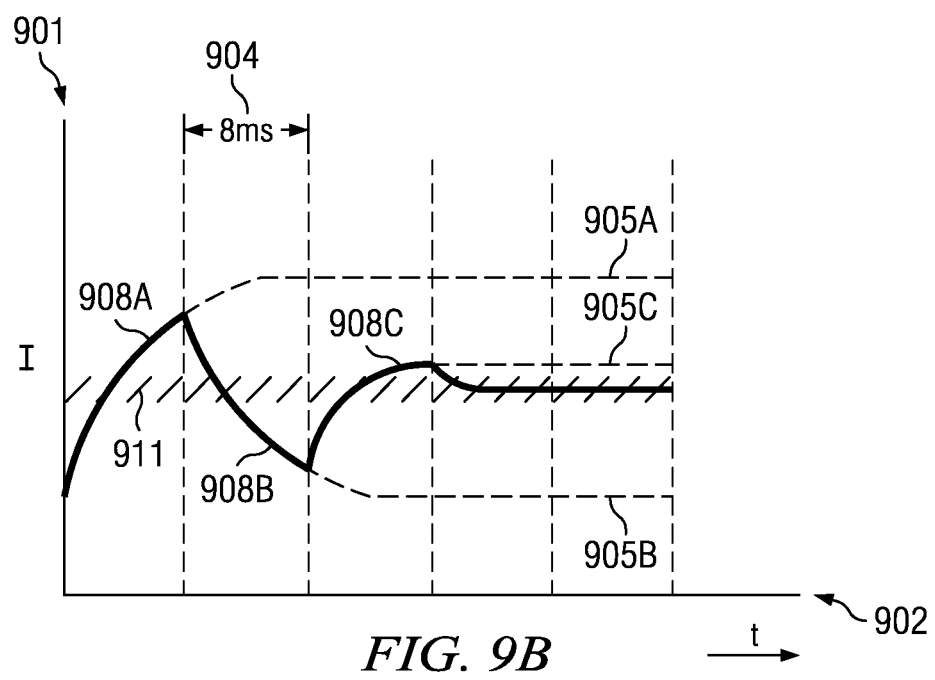
FIG. 9B illustrates the need for overdriving.

FIG. 9B expands on FIG. 9A (and also FIG. 4) with the idea that if displaying a certain pixel intensity is desired (where, as shown in FIG. 9B, pixel intensity crossed the hatched line 911), the system would need to employ a series of overdriving curves. Axis 901 represents intensity and axis 902 the time. FIG. 9B shows that starting from a low value the liquid crystal in the first frame follows curve 908A. If the liquid crystal were allowed to follow the curve it would have achieved the steady state shown by the dotted line 905A.

However, after the first update, the liquid crystal needs to follow a new curve 908B, which is a curve that is supposed to achieve the steady state of curve 905B. At the end of the second frame, the system updates the display again such that the liquid crystal follows curve 908C. Curve 908C is the transition curve for driving a liquid crystal to what was supposed to be at steady state at point 905C.

In FIGS. 8, 9A and 9B, the liquid crystal passes through the transition state where the curve has not yet reached equilibrium. At each frame update the liquid crystal moves on to a new curve, and the liquid crystal never gets the opportunity to reach a steady state.

Figure 10:
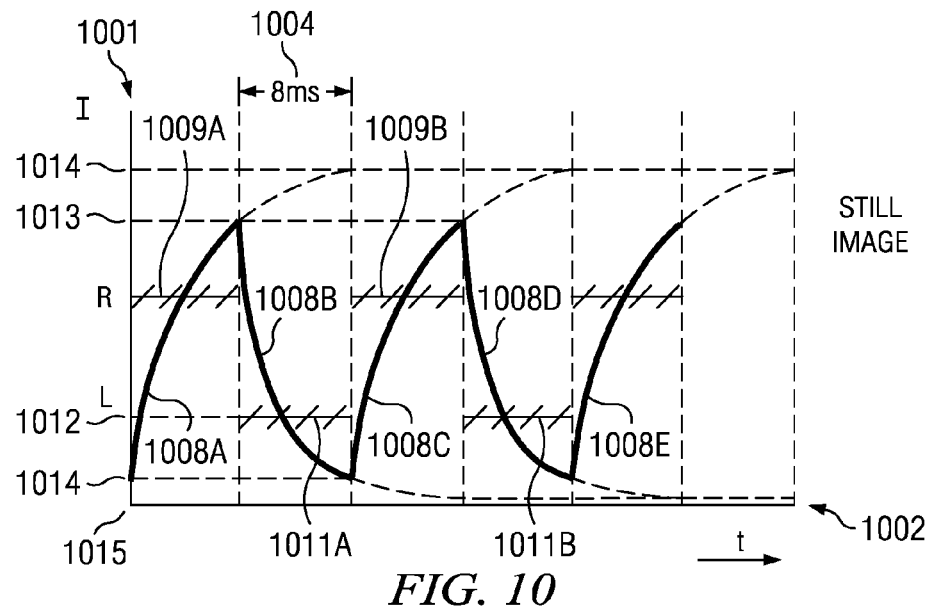
FIG. 10 shows different values being shown for the left eye and right eye.

FIG. 10 returns to the concept that the left eye and the right eye must show different values. In FIG. 10 axis 1001 is the intensity and axis 1002 which is time. FIG. 10 represents a stereoscopic still image, where the left eye shows one pixel value and the right eye shows a different pixel value. The left eye value never changes and the right eye value does not change. Interval 1004 represents the field rate, or the frame duration here, which is 8 milliseconds.

In the still image, the right eye value is represented by the hatched line 1009A, and the left eye is shown by the hatched lines 1011A and 1011B. The liquid crystal starts from intensity 1014. For the frame to appear as if the perceived intensity is the intensity shown by the hatched line 1009A, the liquid crystal needs to closely follow the curve 1008A. In order to have the liquid crystal follow curve 1008A, the system commands the display to a target value 1014 so that by the end of the frame the liquid crystal reaches intensity 1013.

For the left eye value, the desired perceived pixel intensity is as shown by the hatched lines 1011A, or the intensity at 1012. In order to achieve this level, the liquid crystal must be overdriven to follow curve 1008B. This requires the system commanding the display to drive the liquid crystal toward the final value 1015, and at the end of the second frame, the liquid crystal reaches the intensity value 1014.

To then go back to the right eye image requires the liquid crystal to substantially follow curve 1008C, which can be accomplished by commanding the display to the target value 1014. Commanding the display in this manner causes the liquid crystal to follow curve 1009B, and at the end of that frame the liquid crystal reaches intensity value 1013. The process repeats with curves 1008D and 1008E such that for the right eye, perceived intensity is as shown by hatched line 1009A and for the left eye, perceived intensity is hatched line 1011A and 1011B.

Figure 11:
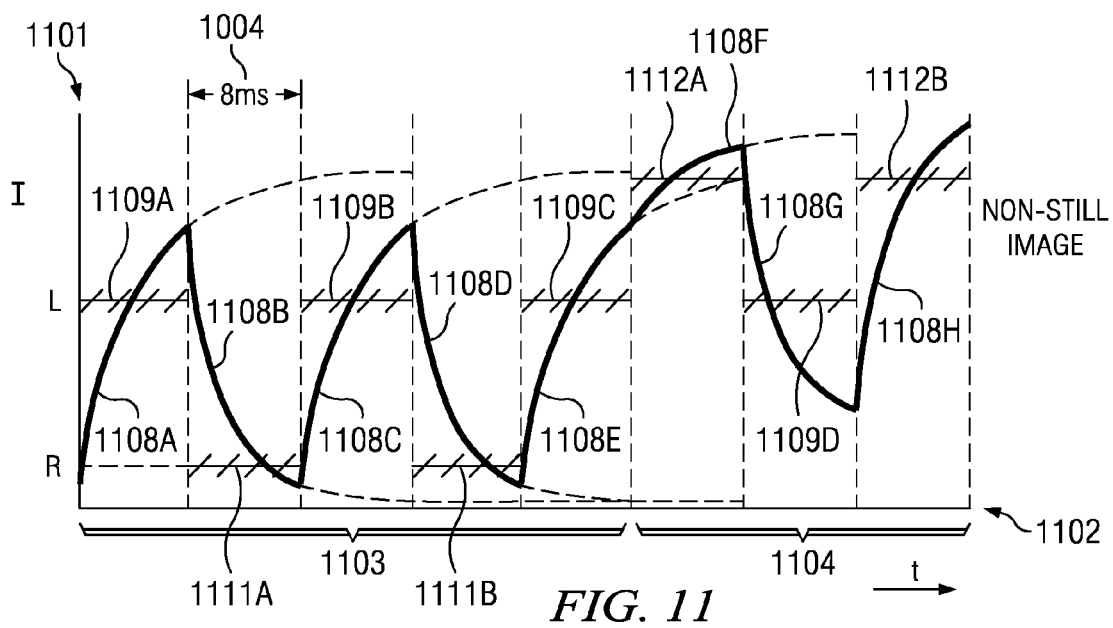
FIG. 11 illustrates that overdrive relies on knowing the starting state of the liquid crystal and the desired perceived pixel intensity for that frame.

In FIG. 11, the intensity is represented by axis 1101, time is represented by 1102. In FIG. 11, with a non-still (moving) image, one combination of left and right pixel values over the interval 1103 is shown. However, because the image changes over the interval 1104, we get a different set of pixel values. One example is a perceived pixel intensity as indicated by the hatched lines 1109A, 1109B, 1109C, and 1109D (left eye), and the hatched line perceived pixel intensity value indicated by 1111A and 1111B and 1112A and 1112B (right eye). During the interval 1103, the right eye is at pixel intensity as indicated by the hatched lines 1111A and 1111B, and in the interval 1104 the perceived pixel intensity is as indicated by 1112A and 1112B.

Similar to FIG. 10, during the interval 1103 the liquid crystal is overdriven so that the liquid crystal follows the curves 1108A, 1108B, 1108C, 1108D and 1108E. In this manner, the average values again follow the hatched lines 1109A, 1111A, 1109B, 1111B and 1109C. When the new right eye perceived pixel intensity is shown for the interval 1104, the curve that should be followed to achieve the new average value is indicated by the hatched line 1112A. In order to give the appearance of that level of pixel intensity, the liquid crystal must be driven on a new curve 1108F, which is different from curves 1108D and 1108B.

This new overdriving results in a new pixel intensity to display. As a result of the overdriving, following the curve 1108F and achieving the perceived pixel intensity 1112A, in order to again show the left eye pixel value, the next frame needs to closely follow the curve 1108G. That curve is different from curves 1108E, 1108C or 1108A, which were used to achieve a similar average intensity. Even though the hatched line 1109D is at the same perceived pixel intensity as 1109A, 1109B and 1109C, the curve used to achieve point 1109D (curve 1108G) differs from the curves used to achieve the perceived intensity for points 1109A, 1109B and 1109C, namely curves 1108A, 1108C, and 1108E.

Finally, even though the perceived pixel intensity at point 1112B is the same as at point 1112A, the liquid crystal is at a different starting point, so the curve 1108H is different from curve 1112A. This is again showing that overdriving relies on knowledge of the starting state of the liquid crystal and the desired perceived pixel intensity for the frame. At the end of the frame the liquid crystal is at a different intensity level.

Figure 12:
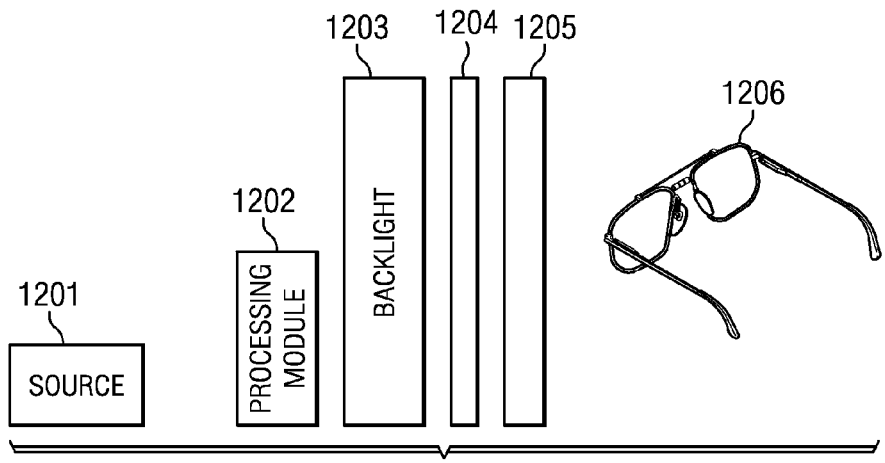
FIG. 12 is a diagrammatic layout of one practical implementation of the design.

FIG. 12 shows the diagrammatic layout of a practical implementation of the present design. Three dimensional (3D) images are provided by an external source 1201. The source 1201 may be in a number of different 3D formats, including sequential frames and canister formats. This source is fed into the processing module 1202. More than one processing module may be provided. The images are sequenced in the processing module so that left and right eye images alternate. These images are provided sequentially to the TFT panel 1204 where they are displayed by shining a backlight 1203 through the TFT panel 1204. To separate the left and right eye frames, left and right eye frames are displayed sequentially (at a high frame rate) and the polarization state is changed dynamically by the Pi-cell 1205, providing opposite circular polarization on left and right frames. The polarization state is analyzed by the polarized eyewear 1206, sequentially directing left and right images to the corresponding or appropriate eye.

Figure 16:
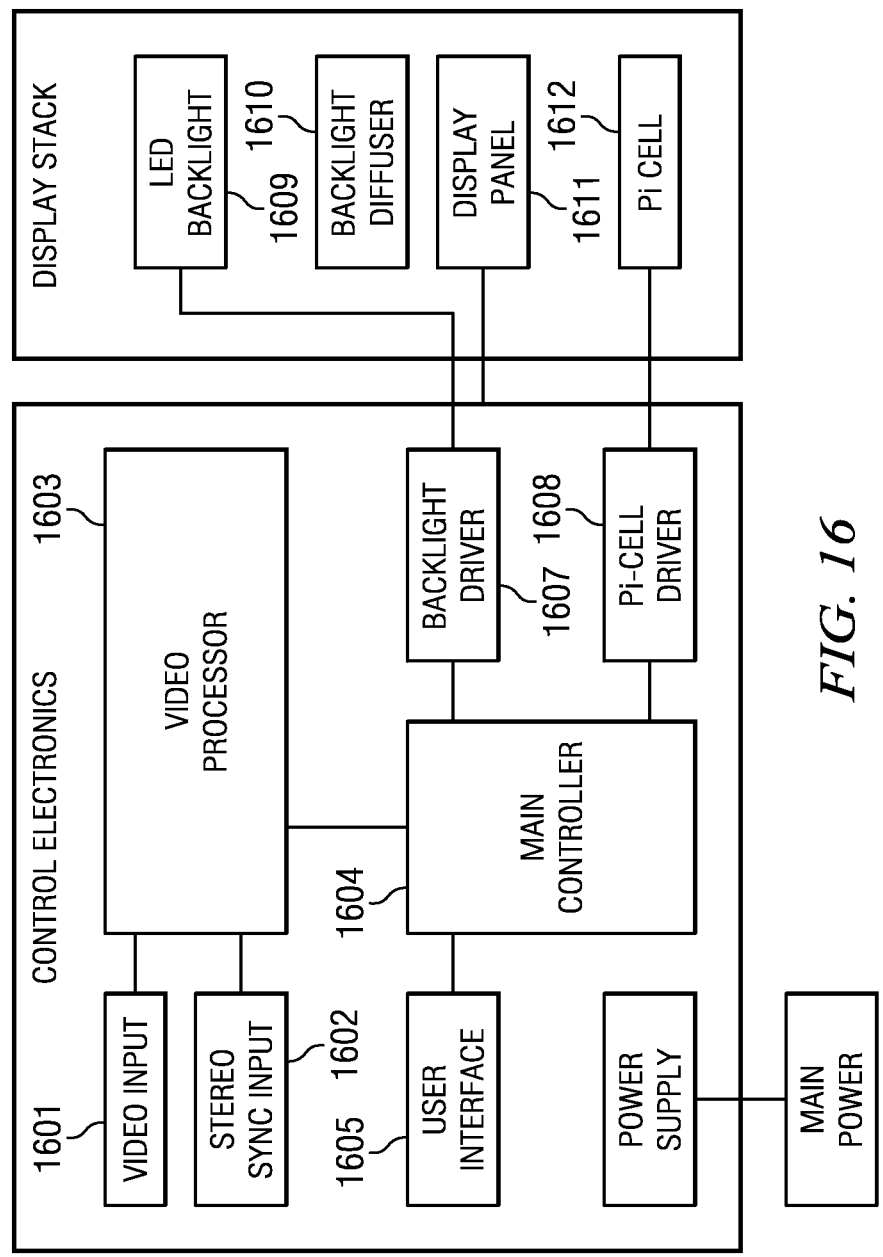
FIG. 16 illustrates the functional relationship of the processing electronics.

FIG. 16 provides a description of the functional relationship of the processing electronics. The processing module consists of the control electronics necessary to interpret and manage the incoming images, and control and manage the operation of the display. The block diagram in FIG. 16 provides a description of the functional relationship of the processing electronics.

FIG. 16 shows the image input 1601 and optional stereo sync input 1602, which may provide identification of left and right frames to the video processor board 1603. The functions within the video processor block are described more fully in FIG. 17. A controller 1604 provides the management functions of the display, responds to user interface 1605 requests and synchronizes the backlight driver 1607 and pi cell driver 1608 with the image. The backlight driver 1607 controls the timing of switching the backlight segments (see FIGS. 14A and 14B).

The display stack consists of the visual elements of the display. The LED backlight 1609, controlled by the backlight driver 1607, provides the illumination to the display in particular in a manner that allows certain rows of the display to be illuminated while others are not. The backlight may be provided by multiple white LEDs (light emitting diodes), triplets of RGB LEDs, or hot cathode fluorescent lamps. The backlight diffuser 1610 serves to provide even illumination to the display panel 1611. The display panel is usually an active matrix LCD type panel which receives video signals from the video processor. The Pi cell 1612 serves to switch polarization states between left circular and right circular polarization.

In a preferred embodiment, the LED backlight module 1609 is a PCB approximately 12.5 inches by 15.5 inches in size with 120 LEDs arranged on a grid of 10 rows by 12 columns. The LEDs are spaced approximately 1.1 inches on center. The LEDs in each row are wired in series and are turned on or off as a group independently of the other rows.

The rows are illuminated in sequence so that a stripe of illumination scans from the top to the bottom. The stripe is made up of one or more rows.

A diffuser is placed between the display panel and the backlight LEDs to "flatten" the illumination density coming from the backlight. The diffuser also manages the light from the backlight rows to minimize the spill of light onto adjacent rows.

The pi-cell or pi cell is similar to that described in U.S. Pat. No. 4,792,850, and encodes the display image in one of two polarization states. In one aspect, the pi-cell has 16 segments (FIG. 15 illustrates the segments). With proper bias and drive voltages, each pi-cell segment either is a ½ wave retarder, or is isotropic. The pi-cell has a fast-axis which is selected to be at 45 degrees to the TFT panel's linear polarization angle.

There is a ¼ wave retarder sheet laminated to the pi-cell. The ¼ wave sheet is oriented so that its fast axis is 90 degrees to the pi-cell. A further anti-reflective coating is optionally laminated to the pi cell assembly. Each pi cell segment is addressed individually through connection to the pi cell driver.

Figure 17:
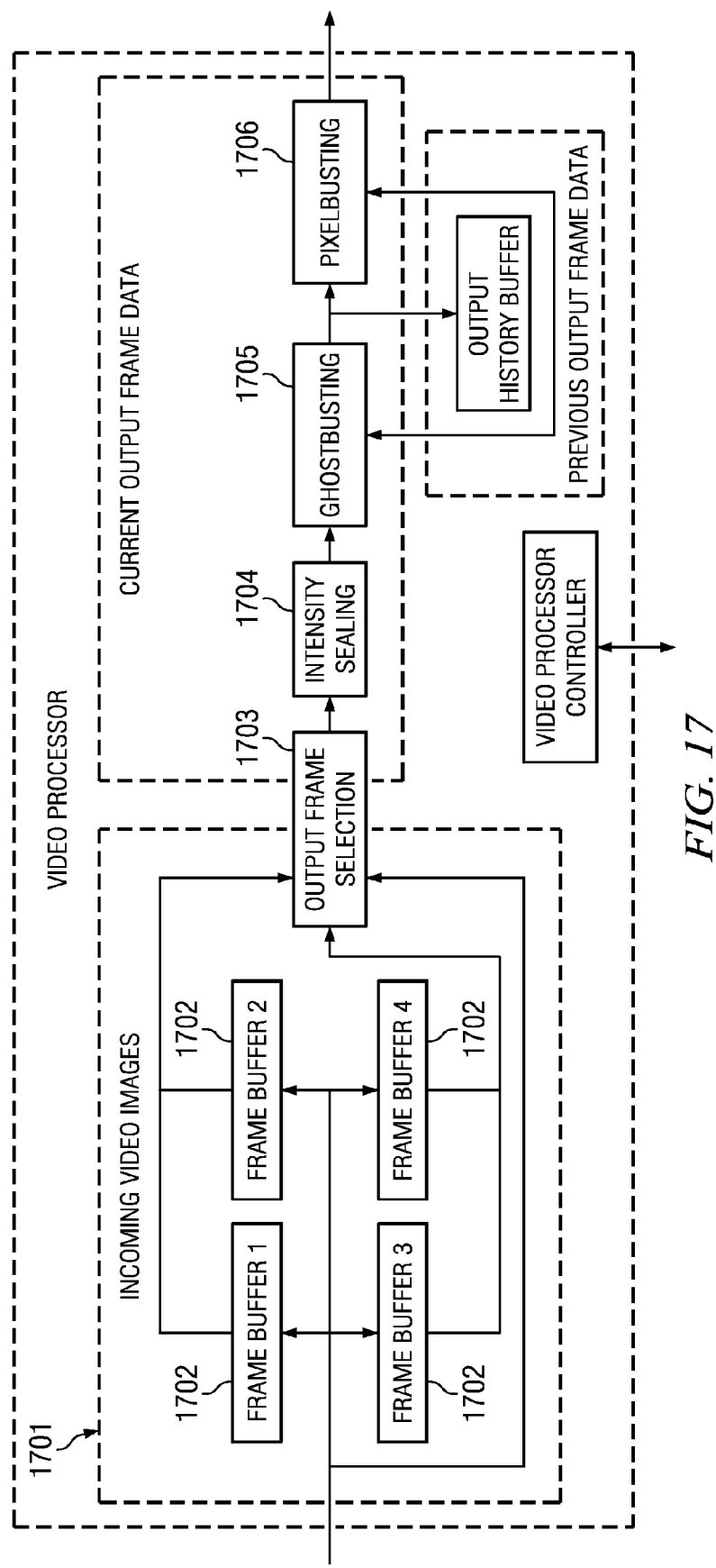
FIG. 17 shows the functional diagram of the video processing electronics.

FIG. 17 shows the functional diagram of the Video Processing Electronics. Images to be displayed enter the Fast LCD monitor via an input cable that connects the image source to the monitor. The images can be stereo images in either frame-sequential or in a combined "canister" format, and can also be simultaneous dual-input stereo. The images can also be non-stereo images for non-stereoscopic viewing.

In addition, there may be a stereo sync signal from the video source to indicate the "eye" of the image currently being output from the video source.

The system analyzes the video signal to determine its resolution and video timing. If the resolution matches the native resolution of the image display panel, the video timing is compatible with the image display panel, the format is sequential L-R images (page flip) and the refresh rate is sufficiently high for comfortable stereoscopic viewing, the image signal bypasses input buffering shown at point 1701.

However, if any of the above conditions is not met, the incoming video is buffered in the input buffers 1702 and then read out in the proper sequence and timing to match the desired operation of the image display panel, and to match the desired output frame rate for comfortable stereoscopic viewing.

The input buffering allows lower resolution image to be centered to the native resolution of the monitor's image display panel. For example, if the incoming video is at 1024×768 resolution, the monitor would "pad" the top, bottom, left, and right with additional pixels to fit the image in the monitor's native 1280×1024 resolution, and would read out the incoming image from the input buffer as needed to draw the image in the center area.

The input buffering also allows double- or triple-flashing of incoming images. For example, the frame-sequential stereo video could come in at 60 hertz 30 hertz in left eye and 30 hertz in right eye. If this pair of left and right eye images is displayed at the original frame rate, there would be objectionable flicker for the viewer because each eye is presented with a 30 hertz image. In order to reduce the flicker, the frame rate is doubled by displaying the pair of images in half the time period of the original pair, and then the pair is repeated once more. For triple flashing, the pair is displayed in $\frac{1}{3}^{rd}$ the time of the original pair, and then the pair is repeated two more times).

The input buffering also allows for receiving a stereo image in a single "canister" frame, and then splitting them into separate left and right frames to be processed by later stages.

The video data that comes out of the INPUT BUFFERING stage (whether by bypassing the INPUT BUFFERING processing, or by performing one or more of padding, double-/triple-flashing, or canister separation) is now formatted in resolution and timing to be suitable for the image display panel, and has timing that is suitable for proper stereoscopic viewing. The "output frame selection" 1703 chooses the correct frame to display, depending on the format selected.

The intensity of the image is scaled 1704 to prepare the image for future processing. The image data from the video source represents its pixel intensity from black to full intensity using the values 0 to 255, with 0 representing black, 255 representing full intensity, and values in between representing the various shades in between.

The TFT panel accepts image data with the pixel intensity represented by 8-bit values, with 0 representing black, and 255 representing full intensity, and values in between representing the various shades in between. During standard non-stereoscopic operation, the panel is able to faithfully display a range of intensities represented by the values 0 to 255.

When the panel is operated in high-frame-rate stereoscopic mode, the useful range of displayed intensities may be limited by the performance limit of the panel.

For example, for one of the panels currently available and manufactured by LG Electronics, a range of 10 to 236 is used, meaning that the blackest black available on the display has a code value of 10. This range limitation allows for overshoot to be built into the signal to give faster response.

It should be noted that the range of values 0 to 255 is for 8-bit representation of image data; other ranges can exist—e.g., 6 bit video representation uses 0 to 63; 12-bit video uses 0 to 4095, and so on.

The display by its nature has leakage from one eye view to the other. This crosstalk results in ghosting, which is detrimental to providing satisfactory display performance. This ghosting can be predicted and compensation can be performed to minimize its effects. This is performed in the Ghostbusting block 1705.

Generally speaking, the ghost busting technique simultaneously evaluates the left and right images of a stereo pair to create a new pair of ghost-compensated images which to be output by the display. For example, the system evaluates the original left image to determine the amount of ghost that the image would introduce into the right view, based on predictive models. This amount of "ghost" is then used to calculate the adjusted right-eye image, which includes the appropriate "anti-ghost" value. To the right eye, when this adjusted image is displayed, the anti-ghost value cancels out the ghost value contributed during the output of the left-eye image. With this cancellation, the right eye of the viewer sees the originally intended right eye view. The same process is used to generate the adjusted left-eye image in order to present the originally intended left eye view.

The above-described "ghostbusting" scheme operates simultaneously on a pairwise set of original input images to calculate a pairwise set of compensated output images. This simultaneous pair-wise compensation approach works well when both images of the stereo pair can be received simultaneously, but can present a number of shortcomings when processing frame-sequential stereo inputs.

First, there is a pipeline delay of at least one frame time between the input and the output. This occurs because the image data for both eyes is needed before either eye's compensated image can be calculated. For each image pair, the first image must be stored until the information from the second image of the pair becomes available. As the second image is received, the calculation can then proceed to generate the compensated first image.

Second, the pairwise ghostbusting requires at least two image buffers to process each frame-sequential stereo pair. This is because the first image must be held in the buffer until the data for the second image arrives, and the output of the compensated second image must be delayed until the compensated first image has been output.

Third, the resulting compensated images must be displayed in a pairwise manner because ghost compensation is performed in a pairwise manner. The resulting compensated images are (by definition) calculated to minimize ghosting when both images are output to the display.

The stereoscopic LCD uses the benefits of ghost compensation, but does it in a process that is more suitable for frame-sequential stereo input. While the pairwise approach works to minimize the ghosting within each stereo pair, the frame-sequential approach works to minimize the ghosting from one output frame to the next.

The frame-sequential ghost busting scheme eliminates the pipeline delay, reduces the image buffering needed to perform ghost reduction, and reduces ghosting without requiring that the display to always output stereo images in a pairwise manner. When the output is double- or triple-flashed, the compensated images are output in pairs.

The frame-sequential ghost busting operates as follows. A history buffer (ring buffer/FIFO (first in first out) buffer) contains the output image of the previous frame. As pixel data for the current frame arrive, data for the corresponding pixel from the previous frame are read out from the history buffer. The anti-ghost value needed to compensate for the ghosting by the previous frame is added to the current frame's pixel value to yield the compensated image value. The compensated image value is output to the display. The compensated image value is also written into the history buffer so that the current frame's ghost contribution to the next frame can be determined. The anti-ghost calculation can be performed either by explicit calculation, or can be implemented with a lookup table, or both in combination.

The frame-sequential ghost busting approach offers the several benefits. First the processing pipeline does not require a one frame pipeline delay between the input and the output. Second, only one image buffer is needed to perform the compensation calculation. Third, because the dominant mechanism for ghosting is caused by the residual image from the previous frame, the method is better suited for ghost pre compensation.

As was discussed with respect to FIGS. 1 to 8, the LCD display experiences long switching times relative to the short frame time required for sequential 3D. To assist with the switching time, the pixel drive signal can be overdriven to come to the correct light level in a shorter period of time. The model to characterize the switching speed of the display is complex, and requires that each possible switching transition be characterized. To achieve benefit from this approach, a scheme is developed where the required drive value is predicted to achieve the correct pixel luminance at a given time.

The predictive model is implemented in either an algorithm or a look up table (or series of tables) and is identified as "pixelbusting" 1706 in FIG. 17. Pixel busting and ghost busting may be combined into a single functional block with a look up table that covers both functions.

Figure 13A:
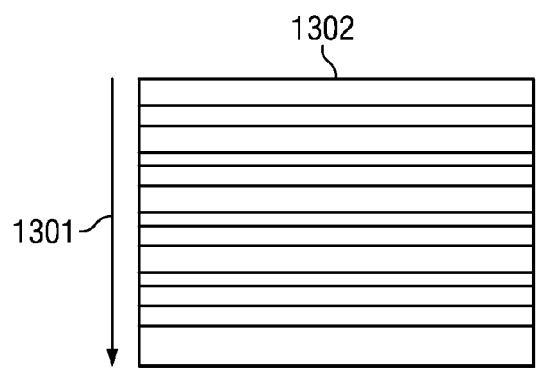
FIGS. 13A and 13B show the scanned nature of the LCD display.
Figure 13B:
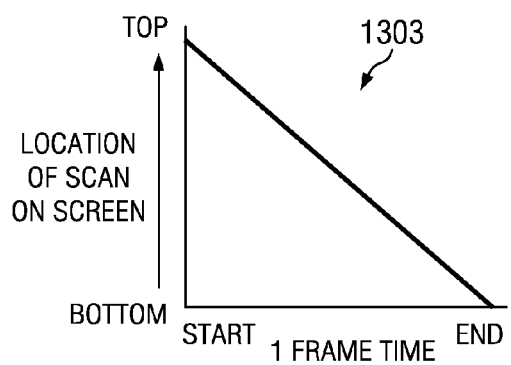

FIGS. 13A and 13B demonstrate the scanned nature of the LCD display. The image on the display is refreshed first at the top of the display, and then sequentially down to the bottom of the display 1301, in lines or small groups of lines 1302. The relationship between the time that a line of the display is activated and the point on the frame time is shown by the line 1303.

FIGS. 14A, 14B, 15A, and 15B illustrate that the backlight 1401 and pi cell 1501 are segmented, with each segment being controllable. This arrangement allows the illumination of the pixel, and the polarization state of the pixel to be timed for optimum performance. As described with respect to FIGS. 1 to 8, each individual pixel in the display takes time to come to equilibrium at the desired final drive state. This time is controlled by the luminance level of the previous frame, the desired luminance level and the amount of overdrive applied. By knowing the time when the correct luminance value is achieved, the backlight corresponding to that pixel can be lit at this time.

A predictive model provides the correct luminance for a given desired luminance value. The model considers the point in time when the pixel is addressed, the pixel value from the previous frame, the desired pixel value, and the display response characteristics. The backlight corresponding to that pixel can be illuminated at a set time, and the ZScreen shutter can be activated at that time. Because all pixels in a given region are affected by a given backlight segment and a corresponding ZScreen segment, the model determines the correct luminance value to occur at the period in time when the backlight is illuminated.

Figure 14A:
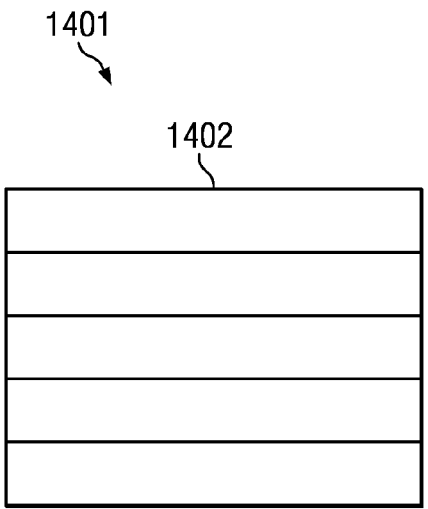
FIGS. 14A and 14B illustrate a segmented backlight, where each segment is controllable.
Figure 14B:
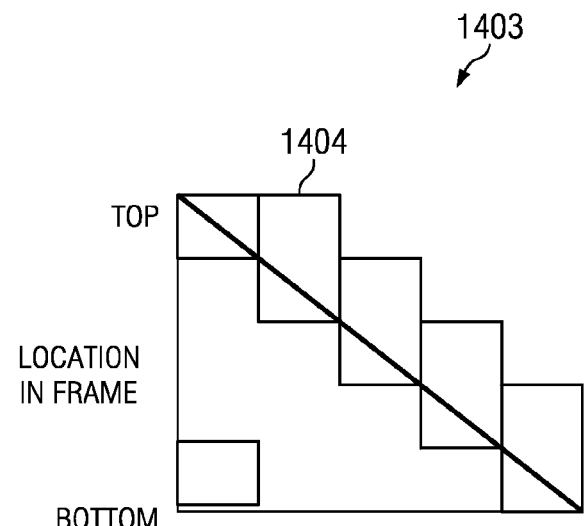
Figure 15A:
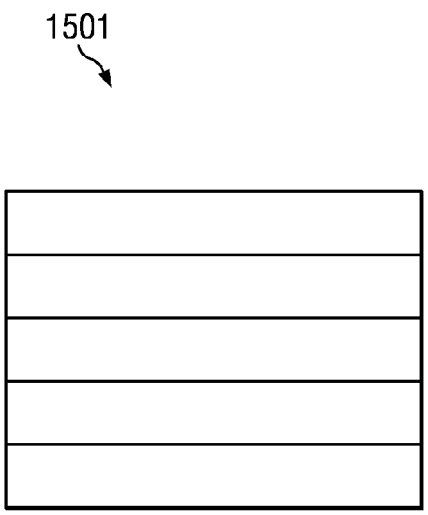
FIGS. 15A and 15B represent a segmented pi cell, where each segment is controllable.
Figure 15B:
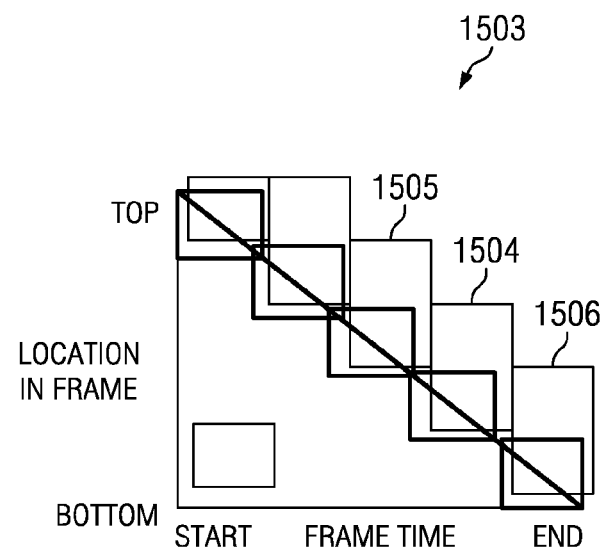

FIGS. 14A and 14B illustrate a simplified case of a five segment backlight 1402 and its operation 1403, while FIGS. 15A and 15B illustrate a five segment pi cell. Note that in practice many segments can be used in both the backlight and the pi cell, and that the backlight and pi cell do not necessarily require the same number of segments. In one embodiment, the pi cell has 16 segments and the backlight has 10 segments.

FIG. 15B illustrates the operation 1503 of a segmented pi cell 1501 where each segment is controllable. The scan 1303 from FIG. 13B may be overlaid to illustrate the location of the scan on the screen against the frame time. Similarly, the backlight operation described in FIG. 14B may also be overlaid to show the sequential operation of the backlight segments in relation to the frame time. As may be seen, at time period 1505, the second and third backlight segments are illuminated after the liquid crystal has adequately settled in the relevant screen segment, and the third pi cell segment is switched also. In the next sequence, shown as time period 1504, the third and fourth backlight segments are illuminated after the liquid crystal has adequately settled in the relevant screen segment, and the fourth pi cell segment is switched. Similarly, the next sequence shows the time period 1506, in which the fourth and fifth backlight segments are illuminated in sequence with the liquid crystal being addressed and settling in the associated screen segment, and in which the fifth pi cell segment is switched.

The pixel is addressed with a pre determined voltage level, and held for the frame duration. This level is predetermined from the model, using the previous frame value, the desired output luminance value as inputs. Reaching equilibrium may take a long time, but that the desired luminance level may be reached earlier given appropriate drive levels. At the point where the luminance level of the pixel is correct, the backlight is illuminated. The period of illumination is a set value representing a fraction of the total frame time. The luminance level of the pixel changes during this time, but integrates to the desired luminance level. The last step on the display process puts the correct polarization state on the pixel to ensure that it is seen by the desired eye.

The combination of the LED backlight, the dyes on the LCD cells, the ZScreen and the glasses worn by the viewer introduces some color shift. The color may be corrected through a simple calibration process by measuring the output color on several test screens, and these values are input to the "pixel busting" algorithm, where correction factors are applied to the algorithm to provide the correct color. It may be the case that the color of the left and right eye images is different due to slight imperfections in the polarization states. The correction mechanism will support different calibration factors for left and right eyes.

Thus the present design includes a liquid crystal display device configured to display stereoscopic images. The liquid crystal display device may include an LCD panel, a backlight positioned behind the LCD panel, and control electronics configured to drive the LCD panel to a desired display state. The control electronics are configured to employ transient phase switching to overdrive the LCD panel to a desired state and facilitate relatively rapid display of stereoscopic images. In certain cases, transient phase switching employs a look up table, and the look up table can be employed to drive or overdrive the LCD panel to a desired state.

Figure 18A:
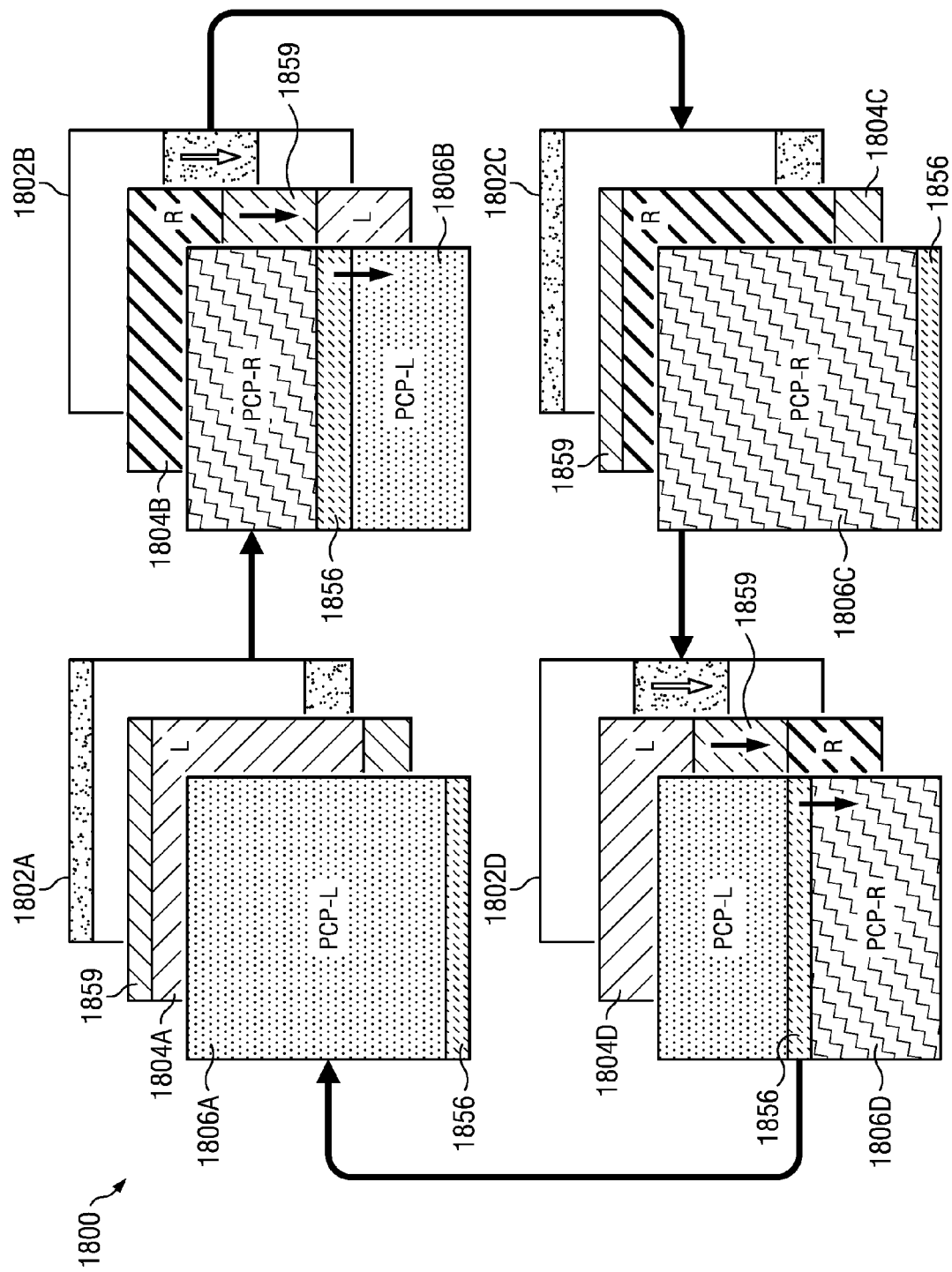
FIG. 18A shows a schematic diagram illustrating an addressing cycle of a stereoscopic flat panel display system.

FIG. 18A is a schematic diagram illustrating an addressing cycle 1800 of a stereoscopic flat panel display system. In this exemplary embodiment, backlight 1802 is spatially controlled and PCP 1806 is segmented, and they may operate in a scrolling manner, in synchronization with the LC modulation panel 1804 update. The backlight 1802, LC modulation panel 1804, and PCP 1806, are shown as separate layers, with the four schematic diagrams (a, b, c, and d) representing the system at four different times of a continuous addressing cycle. One cycle displays a single left and single right eye image. The diagram shows an address cycle where the LC modulation panel 1804 is addressed line-by-line from top to bottom. As the address line progresses downward on the LC modulation panel 1804, the region of settling liquid crystal appears to follow in a continuous scrolling fashion. The physical size of the mixed settling data region 1859 displayed by the switching LC modulation panel 1804 is determined by the settling speed of the material and the frame address rate. As described above, the period taken to switch to black is important, as the black-to-grey and grey-to-grey transitions may be accommodated as discussed by Chiu et al. For commercially-available fast twisted-nematic panels, the white-to-black settling time is around 2 ms, making the physical width of the LC switching band in FIG. 18A somewhat realistic with a 120 Hz frame update.

This exemplary system includes both scrolling segmented PCP 1806 and spatially controlled backlight 1802, as indicated by the different spatially separated portions depicted in the FIG. 18A. The physical size of the PCP 1806 segments and backlight 1802 spatially controlled portions may affect the performance and timing of the system but act very similar to a continuous device when the segments and portions are sufficiently small compared with the width of the unsettled LC 1859.

In an exemplary embodiment, a flat panel display may include a spatially controllable backlight 1802 with a plurality of illuminating portions operable to selectively provide light, a LC modulation panel 1804 having modulation regions, and a PCP 1806. The spatially controllable backlight 1802 may have a plurality of illuminating portions operable to selectively provide light. The PCP 1806 may have a plurality of polarization control segments associated with the modulation regions, such that the polarization control segments may selectively transform the state of polarization (SOP) of modulated light incident from the modulation regions. Also, a selected modulation region may be addressed with left eye image data, and polarization control instructions may be provided to a polarization control segment associated with the selected modulation region to operate in a left eye polarization display mode when a portion of the data lines in the selected modulation region display a predetermined portion of the left eye image frame. Furthermore, light may be provided to the selected modulation region from one or more selected illuminating portions when the selected modulation region includes a settled modulation region presenting image data corresponding to the left eye polarization control instructions.

The above-described embodiment may have many variations. For example, in some embodiments, the PCP may be a pi-cell. In some embodiments, the portion of the data lines in the selected modulation region may include substantially half of the data lines in the selected modulation region. In some embodiments, the polarization control instructions may be provided after addressing a first data line of the selected modulation region. In some embodiments, the polarization control segments may be switched to operate in the left eye polarization display mode and the SOP transformation is maintained for the polarization control segment until the polarization control segment is switched to the right eye polarization display mode (and vice versa for switching in the right eye polarization display mode). In some embodiments, an entire left eye image frame or right eye image frame may be addressed within $\frac{1}{120}$ second. In some embodiments, a settling time of the LC modulation panel for a middle data line of the selected modulation region and a second settling time of the PCP for the associated polarization control segment may be optimized for negligible left and right eye cross-talk when viewing the stereoscopic imagery through left and right eye analyzers. In some embodiments, each polarization control segment may include a zero twist LC zero to half-wave retardation modulator oriented at 45 degrees to an output polarization direction, and a quarter wave retarder oriented at 45 degrees relative to the orientation of the zero twist LC modulator. In some embodiments, the left eye polarization control instructions operate to may cause the zero twist LC modulator to retard light modulated by the LC modulation panel by a half wave, and where right eye polarization control instructions operate to cause the zero twist LC modulator to not retard light modulated by the LC modulation panel. In some embodiments, right eye instructions may operate to cause the zero twist LC to retard light modulated by the LC modulation panel by a half wave, and the left eye instructions may operate to cause the zero twist LC to not retard light modulated by the LC modulation panel. In some embodiments, adjacent segmented polarization control segments may be sequentially scrolled on the PCP. In some embodiments, the PCP may include strips of polarization switches operable to output incoming light to switch between orthogonal polarization states according to the polarization control instructions.

Figure 18B:
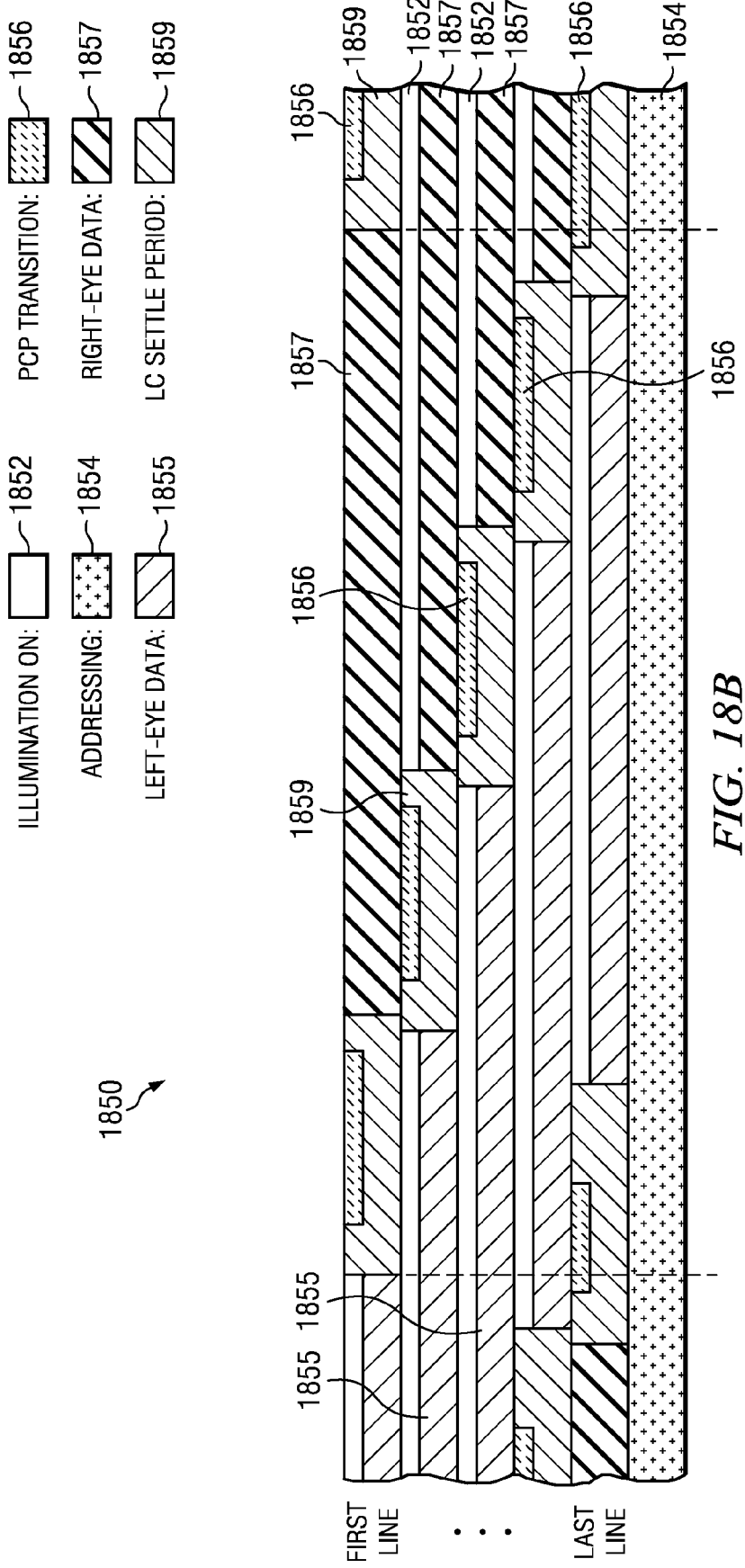
FIG. 18B is a schematic timing diagram illustrating a simplified timing sequence of the display system shown in FIG. 18A.

FIG. 18B is a schematic timing diagram 1850 illustrating a simplified timing sequence of the display system shown in FIG. 18A. In this embodiment, 120 Hz LC addressing is assumed using more than four PCP and/or backlight segments. Under these assumptions, the timing diagram 1850 may be derived showing the periods, states and start times of the different component states for chosen display lines. Each row is meant to represent an LC modulation panel data line and the first and last lines represent the top and bottom lines of the LC modulation panel 1804 respectively. Time goes from left to right.

Each line of the timing diagram in FIG. 18B shows an instant where the line is addressed 1854 followed substantially immediately by a settling period 1859. Then, before the line is addressed again 1854, there is a period where image data is correctly displayed (e.g., 1857 and 1855). Local illumination 1852 occurs after settling 1859 and before the next address instant 1854. The staggering of the lines indicates the scrolling nature of the system. Any one region may not be illuminated approximately 25% of the time (i.e., approximately 75% illumination duty cycle). During the 25% un-illuminated duty cycle, the PCP is locally switched 1856.

The advantages of such a system stem from a modest 120 Hz addressing rate and the large illumination duty cycle, though the system components may have high cost and complexity. Simplifications, as discussed below in FIGS. 4A-7B, through implementation of globally addressed, non-segmented components may reduce the system cost and complexity.

Referring back to FIG. 18B, the timing diagram 1850 also shows the temporally overlapping of left- and right-eye images with conventional LC addressing. At any one instant there is no vertical line that passes through right- or left-eye data only, which precludes the use of a global backlight and PCP components. Fortunately, by manipulating the LC addressing and/or using either a segmented backlight and/or PCP, other systems are made possible.

In accordance with an embodiment illustrated by FIGS. 18A and 18B, a method of displaying stereoscopic imagery on a flat panel display may include addressing data lines in a selected modulation region on the LC modulation panel 1804 with left eye image data. The method may further include providing polarization control instructions to a polarization control segment associated with the selected modulation region, to operate in a left eye polarization display mode when a portion of the data lines in the selected modulation region display a predetermined portion of the left eye image frame. Additionally, the method may include providing the light to the selected modulation region from one or more selected illuminating portions, where the selected modulation region includes a settled modulation region presenting image data corresponding to the left eye polarization control instructions. Vice versa, a similar method may be used to present right-eye image data corresponding to right eye polarization control instructions.

The designs presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method of displaying stereoscopic imagery on a flat panel display, the display having a spatially controllable backlight with a plurality of illuminating portions operable to selectively provide light to a liquid crystal (LC) modulation panel having modulation regions, and a polarization control panel (PCP) having a plurality of polarization control segments associated with the modulation regions, the polarization control segments being operable to receive modulated light from the modulation regions of the LC modulation panel and to selectively transform the state of polarization (SOP) of the modulated light incident from the modulation regions, the method comprising:
    addressing data lines in a selected modulation region on the LC modulation panel with left eye image data; and
    providing, at least after addressing a first data line of the selected modulation region, polarization control instructions to a polarization control segment associated with the selected modulation region, to operate in a left eye polarization display mode when a portion of the data lines in the selected modulation region display a portion of a left eye image frame;
    providing the light to the selected modulation region from one or more selected illuminating portions during the left eye polarization display mode;
    wherein the polarization control segment is operable to output light of a first polarization state after a first transition period.

2. The method of claim 1, wherein the portion of the data lines in the modulation region comprises an amount in the range of 40% to 60% of the data lines in the modulation region that have settled.

3. The method of claim 1, wherein the portion of the data lines in the selected modulation region comprises substantially half of the data lines in the selected modulation region.

4. The method of claim 1, wherein providing polarization control instructions occurs after addressing a first data line of the selected modulation region.

5. The method of claim 1, further comprising:
    switching the polarization control segment to operate in the left eye polarization display mode; and
    maintaining the SOP transformation for the polarization control segment until the polarization control segment is switched to the right eye polarization display mode.

6. The method of claim 1, wherein an entire left eye image frame or right eye image frame is addressed within 1/120 second.

7. The method of claim 1, wherein a settling time of the LC modulation panel for a middle data line of the selected modulation region and a second settling time of the PCP for the associated polarization control segment are optimized for negligible left and right eye cross-talk when viewing the stereoscopic imagery through left and right eye analyzers.

8. The method of claim 1, wherein each polarization control segment comprises a zero twist LC zero to half-wave retardation modulator oriented at 45 degrees to an output polarization direction; and a quarter wave retarder oriented at 45 degrees relative to the orientation of the zero twist LC modulator.

9. The method of claim 8, wherein the left eye polarization control instructions operate to cause the zero twist LC modulator to retard light modulated by the LC modulation panel by a half wave, and wherein right eye polarization control instructions operate to cause the zero twist LC modulator to not retard light modulated by the LC modulation panel.

10. The method of claim 8, wherein right eye instructions operate to cause the zero twist LC to retard light modulated by the LC modulation panel by a half wave, and wherein the left eye instructions operate to cause the zero twist LC to not retard light modulated by the LC modulation panel.

11. The method of claim 1, wherein adjacent segmented polarization control segments are sequentially scrolled on the PCP.

12. The method of claim 1, wherein the PCP comprises strips of polarization switches operable to output incoming light to switch between orthogonal polarization states according to the polarization control instructions.

13. A flat panel display operable to display stereoscopic imagery, comprising:
  a spatially controllable backlight with a plurality of illuminating portions operable to selectively provide light;
  a liquid crystal (LC) modulation panel having modulation regions; and
  a polarization control panel (PCP) having a plurality of polarization control segments associated with the modulation regions, the polarization control segments being operable to receive modulated light from the modulation regions of the LC modulation panel and to selectively transform the state of polarization (SOP) of the modulated light incident from the modulation regions;
  wherein a selected modulation region is addressed with left eye image data, and
  wherein, at least after a first data line of the selected modulation region is addressed, polarization control instructions are provided to a polarization control segment associated with the selected modulation region to operate in a left eye polarization display mode when a portion of the data lines in the selected modulation region display a portion of a left eye image frame,
  wherein light is provided to the selected modulation region from one or more selected illuminating portions during the left eye polarization display mode; and
  wherein the polarization control segment is operable to output light of a first polarization state after a first transition period.

14. The panel of claim 13, wherein the PCP comprises a pi-cell.

15. The panel of claim 13, wherein the predetermined portion of the data lines in the modulation region comprises an amount in the range of 40% to 60% of the data lines in the modulation region that have settled.

16. The panel of claim 13, wherein the portion of the data lines in the selected modulation region comprises substantially half of the data lines in the selected modulation region.

17. The panel of claim 13, wherein the polarization control instructions are provided after addressing a first data line of the selected modulation region.

18. The panel of claim 13, wherein an entire left eye image frame or right eye image frame is addressed within $1/120$ second.

19. The panel of claim 13, wherein a settling time of the LC modulation panel for a middle data line of the selected modulation region and a second settling time of the PCP for the associated polarization control segment are optimized for negligible left and right eye cross-talk when viewing the stereoscopic imagery through left and right eye analyzers.

20. The panel of claim 13, wherein each polarization control segment comprises a zero twist LC zero to half-wave retardation modulator oriented at 45 degrees to an output polarization direction; and a quarter wave retarder oriented at 45 degrees relative to the orientation of the zero twist LC modulator.

21. The panel of claim 13, wherein the left eye polarization control instructions operate to cause the zero twist LC modulator to retard light modulated by the LC modulation panel by a half wave, and wherein right eye polarization control instructions operate to cause the zero twist LC modulator to not retard light modulated by the LC modulation panel.

22. The panel of claim 13, wherein right eye instructions operate to cause the zero twist LC to retard light modulated by the LC modulation panel by a half wave, and wherein the left eye instructions operate to cause the zero twist LC to not retard light modulated by the LC modulation panel.

23. The panel of claim 13, wherein adjacent segmented polarization control segments are sequentially scrolled on the PCP.

24. The panel of claim 13, wherein the PCP comprises strips of polarization switches operable to output incoming light to switch between orthogonal polarization states according to the polarization control instructions.

25. The panel of claim 13, wherein the polarization control segments are switched to operate in the left eye polarization display mode and the SOP transformation is maintained for the polarization control segment until the polarization control segment is switched to the right eye polarization display mode.

* * * * *